United States Patent
Neuhaus

(10) Patent No.: US 8,053,087 B2
(45) Date of Patent: Nov. 8, 2011

(54) ANTIFRICTION COMPOSITE, USE OF THE ANTIFRICTION COMPOSITE, AND METHOD FOR PRODUCING THE ANTIFRICTION COMPOSITE

(75) Inventor: Peter Neuhaus, Gei senheim (DE)

(73) Assignee: Federal-Mogul Wiesbaden GmbH, Wiesbaden (DE)

( * ) Notice: Subject to any disclaimer, the term of this patent is extended or adjusted under 35 U.S.C. 154(b) by 790 days.

(21) Appl. No.: 11/915,283

(22) PCT Filed: May 22, 2006

(86) PCT No.: PCT/EP2006/004832
§ 371 (c)(1),
(2), (4) Date: Jul. 9, 2008

(87) PCT Pub. No.: WO2006/125584
PCT Pub. Date: Nov. 30, 2006

(65) Prior Publication Data
US 2009/0025837 A1 Jan. 29, 2009

(30) Foreign Application Priority Data
May 21, 2005 (DE) .......................... 10 2005 023 541

(51) Int. Cl.
*B32B 15/20* (2006.01)
*F16C 33/12* (2006.01)
*C22F 1/04* (2006.01)

(52) U.S. Cl. ........ 428/654; 384/912; 148/523; 148/535; 148/552; 228/235.3; 428/653

(58) Field of Classification Search .......................... None
See application file for complete search history.

(56) References Cited

U.S. PATENT DOCUMENTS

| | | | | |
|---|---|---|---|---|
| 3,195,991 | A * | 7/1965 | Stern et al. ..................... | 428/646 |
| 4,957,822 | A * | 9/1990 | Steeg et al. .................... | 428/653 |
| 4,973,523 | A * | 11/1990 | Neuhaus et al. ............... | 428/653 |
| 5,112,416 | A * | 5/1992 | Tanaka et al. .................. | 148/437 |
| 5,362,574 | A * | 11/1994 | Tanaka et al. ................. | 428/643 |
| 5,384,205 | A * | 1/1995 | Tanaka et al. ................. | 428/643 |
| 5,470,666 | A * | 11/1995 | Tanaka et al. ................. | 428/653 |
| 7,074,496 | B2 * | 7/2006 | Kagohara et al. ............. | 428/654 |
| 2002/0068189 | A1* | 6/2002 | Kagohara et al. ............. | 428/653 |
| 2002/0104876 | A1 | 8/2002 | Whitney, Jr. et al. | |
| 2003/0012977 | A1 | 1/2003 | Mergen | |
| 2003/0207769 | A1* | 11/2003 | Whitney et al. ............... | 508/103 |
| 2004/0028939 | A1* | 2/2004 | Kagohara et al. ............. | 428/650 |

FOREIGN PATENT DOCUMENTS

| | | |
|---|---|---|
| DE | 36 40328 A1 | 6/1988 |
| DE | 4004703 A1 | 9/1990 |
| DE | 4312537 | 11/1993 |
| DE | 102004025557 | 1/2005 |
| JP | 55-11182 * | 1/1980 |
| JP | 11229060 | 8/1999 |
| WO | WO 97/30845 | 8/1997 |
| WO | WO00/06787 | 2/2000 |

* cited by examiner

*Primary Examiner* — John J Zimmerman
(74) *Attorney, Agent, or Firm* — Robert L. Stearns; Dickinson Wright PLLC

(57) ABSTRACT

The invention relates to an antifriction composite comprising a metal support layer, an intermediate layer produced from an aluminum alloy and a bearing layer produced from an aluminum alloy. The components of the aluminum alloys of the intermediate layer and the bearing layer are identical except for an additional soft phase portion in the bearing layer. Said soft phase portion may include lead, tin and/or bismuth. The invention also relies to a method for producing the inventive antifriction composite.

19 Claims, No Drawings

ANTIFRICTION COMPOSITE, USE OF THE ANTIFRICTION COMPOSITE, AND METHOD FOR PRODUCING THE ANTIFRICTION COMPOSITE

BACKGROUND OF THE INVENTION

1. Technical Field

The invention relates to a plain bearing composite material and to uses and a method for producing the plain bearing composite material.

2. Related Art

Known from DE 40 04 703 A1 is a layer material for plain bearing elements comprising a metal supporting layer and a an aluminium-based bearing material. The aluminium alloy comprises 1-3 wt. % nickel, 0.5-2.5 wt. % manganese, 0.02-1.5 wt. % copper. 0.5-20 wt. % tin and the remainder being aluminium with the usual impurities. The bearing alloy further contains certain fractions of hard particles substantially in particle sizes $\leq 5$ µm.

In this layer material, an intermediate layer of pure aluminium is provided as an option to improve the bond between the steel back and the bearing material. This plain bearing composite material has good fatigue strength values under a loading up to 80 MPa, good wear resistance and good corrosion safety values.

When this plain bearing composite material with pure aluminium as an intermediate layer is used under fairly high loadings, that is at loadings above 80 MPa, it has been found that the material, in particular that of the intermediate layer, deviates laterally at layer thicknesses >80 µm which, as a result of an enlargement of the bearing width, can lead to a perturbing axial projection in bearing shells or bearing bushings and can thereby even result in failure of the motor.

Known from DE 36 40 328 A1 is a layer material for plain bearing elements comprising an aluminium alloy which differs from the aluminium alloy of DE 40 04 703 A1 by omitting the zinc fraction.

This aluminium bearing alloy is used as a bearing material which allows loading capacities up to 80 MPa before fatigue cracks can be detected in the bearing material layer.

US 2002/0104876 describes a layer composite material comprising a steel back, an aluminium-based intermediate layer with a thickness of 60-120 µm and comprising a bearing metal layer made of an aluminium alloy. The bearing metal layer contains 4-20% lead or tin, up to 26% silicon, up to 2% magnesium, manganese, nickel, tin, copper or chromium. The intermediate layer preferably consists of pure aluminium or an aluminium alloy such as, for example AlMnCu1. The fatigue strength of the layer composite material is a max. 100 MPa. The intermediate layer is joined to the bearing metal layer by means of a hot rolling cladding process.

All layer composite materials have the production-technology disadvantage that the material for the intermediate layer and the material for the bearing layer cannot be produced without considerable expenditure on the same casting system.

SUMMARY OF THE INVENTION AND ADVANTAGES

The object of the invention is a plain bearing composite material which has at least the same fatigue strength vales as the known plain bearing composite materials and is easier to produce with regard to production technology.

This object is achieved with a plain bearing composite material having a metal supporting layer, an intermediate layer of an aluminium alloy and a bearing layer of an aluminium alloy, where the components of the aluminium alloys of the intermediate layer and the bearing layer agree apart from an additional soft phase fraction in the bearing layer.

The agreement between the components of the two aluminium alloys allows both alloys to be process on the same casting system without the need to interpose a time-consuming cleaning process when changing from one alloy to the other.

DETAILED DESCRIPTION

The production method on the same casting system is particularly simple if the quantities of components added to the aluminium of the aluminium alloys of the intermediate layer and the aluminium alloy of the bearing layer are the same apart from the additional soft phase fraction in the bearing layer. The soft phase fraction in the bearing layer is at the expense o the aluminium fraction in the aluminium alloy. Thus, the material for the intermediate layer can first be cast, in which case only the additional soft phase fraction must be added to the aluminium alloy processed so far and the aluminium fraction reduced by the same fraction in order to produce the bearing layer material.

Lead, tin and/or bismuth are preferred as soft phase fractions.

The soft phase fraction is preferably 5-20 wt. % relative to the total aluminium alloy, in particular 8-15 wt. % and more particular $\geq 8$-12 wt. %.

When tin is used as the soft phase fraction, a range of 9-11 wt. % is particularly preferred.

The following aluminium alloys are preferred for the production of the intermediate and bearing layer:

1.0-3 wt. % Ni, 0.5-2.5 wt. % Mn, 0.02-1.5 wt. % Cu, the remainder being aluminium with the usual permissible impurities, where the aluminium alloy of the bearing layer additionally contains the soft phase fraction;

0.5-2.5 wt. Cu, 0.1-1.5 wt. % Mn, the remainder being aluminium with the usual permissible impurities, where the aluminium alloy of the bearing layer additionally contains the soft phase fraction;

2.0-3.0 wt. % Si, 0.3-1.0 wt. % Cu, 0.1-0.3 wt. % Cr, the remainder being aluminium with the usual permissible impurities, where the aluminium alloy of the bearing layer additionally contains the soft phase fraction;

0.2-2.0 wt. % Si, Cu, Mn and/or Ni, the remainder being aluminium with the usual permissible impurities, where the aluminium alloy of the bearing layer additionally contains the soft phase fraction;

1-6 wt. % Si, optionally 0.05-5 wt. % of at least one of the following elements Ni, Mn, Cr, Cu, Ti, the remainder being aluminium with the usual permissible impurities, where the aluminium alloy of the bearing layer additionally contains the soft phase fraction.

It has been shown that the fatigue strength of the plain bearing composite materials is higher than 80 MPa without the intermediate layer being laterally pressed out, as is the case with pure aluminium intermediate layers.

It is advantageous if the intermediate layer contains hard particles having diameters of 1-10 µm and the bearing layer contains hard particles having diameters of 1-15 µm. In this case, the fraction of hard particles having diameters up to 10 µm in the intermediate layer is preferably up to 95% and the fraction of hard particles having diameters up to 15 µm in the bearing layer is up to 95%.

The hard particles comprise Si particle as intermetallic phases of AlNi, AlNiMn or AlMn.

The advantage of these fractions of hard particles is that the aluminium matrix both of the bearing metal and of the intermediate layer is hardened and consequently, as a result of the increased strength and the abrasion resistance, the loading capacity and the fatigue strength of the bearing metal composite is improved.

It has been shown that the fatigue strength of the plain bearing composite material depends on the thickness of the intermediate layer. It has been found that if the thickness of the intermediate layer is 15-60 μm, in particular 35-50 μm and more particularly 35-<50 μm, the fatigue strength is somewhat higher than for greater thicknesses of the intermediate layer, where values for the fatigue strength higher than 100 MPa can be achieved.

If the thickness of the intermediate layer is related to the thickness of the bearing layer, values of 5-20%, in particular of 7-17% have proved preferable.

The following table gives five examples of alloy combined with different intermediate layer thickness, where the fatigue strength was determined by the sapphire method in each case.

| Example | Chemical composition bearing alloy | Chemical composition intermediate layer | Thickness intermediate layer (μm) | Fatigue strength (MPa) |
|---|---|---|---|---|
| 1 | AlSn10Ni2Mn1Cu | Al 99.5 | 60 | 116 |
| 2 | " | Al 99.5 | 35 | 76 |
| 3 | " | AlNi2Mn1Cu | 120 | 82 |
| 4 | " | AlNi2Mn1Cu | 75 | 86 |
| 5 | " | AlNi2Mn1Cu | 35 | 112 |

The examples relate to a bearing alloy of AlSn10Ni2Mn1Cu where according to Examples 1 and 2, a pure aluminium layer having a thickness of 60 or 35 μm is provided. In Example 1 a simulated fatigue strength of 116 MPa is achieved and in this case, the aluminium layer has broadened significantly. In this case, the lateral projection of the aluminium layer beyond the bearing width reaches values of more than 500 μm.

When the layer thicknesses of the pure aluminium intermediate layer are smaller, only lower fatigue strengths are achieved, 76 MPa in Example 2.

It can be deduced from the examples according to the invention that as the thickness of the intermediate layer decreases, an increase in the fatigue strength occurs, a value of 112 MPa being achieved at a thickness of 35 μm.

A rolling-clad compound preferably exists between the intermediate layer and the bearing layer. A rolling-clad compound preferably also exists between the bearing layer and the metal supporting layer.

As a result of these exceptional properties, the plain bearing composite material is particularly suitable for plain bearing elements, in particular plain bearing shells, plain bearing bushes and/or thrust washers and for the production of such plain bearing elements.

A particular use is provided for applications with loads of 80 MPa, in particular >100 MPa. The plain bearing composite materials according to the invention are also suitable for rotational applications with sliding speeds of up to 21 m/sec.

The production method is characterised by the following steps:

strip casting of the aluminium alloys for the intermediate layer and baring layer, for the production of an intermediate layer strip and a bearing layer strip, where the components of the aluminium alloys of the intermediate layer and the bearing layer are the same apart from an additional soft phase component in the bearing layer, annealing the intermediate layer strip at 400-500° C. for a duration of 10-14 hours and annealing the bearing layer strip at a temperature of 400-600° C. for a duration of 10-24 hours, rolling the intermediate layer strip to cladding thickness, annealing the intermediate layer strip at 250-350° C. for 8-14 h, cladding by rolling to join the intermediate layer and bearing layer strips to form a composite, rolling the composite to the desired cladding thickness, cladding by rolling the composite onto a steel supporting layer to produce a composite material and annealing the composite material at 250-350° C. for 10-24 h.

In this case, the strip casting on the aluminium alloys is preferably carried out on the same casting system, where preferably first the intermediate layer and then, by adding the soft phase fraction and suitably reducing the aluminium fraction, the bearing layer material is cast as strip.

The annealing of the intermediate layer strip is preferably carried out at 450-480° C. Preferred durations are 11-13 h. The annealing of the bearing layer strip is preferably carried out at 450-550° C. Preferred durations are 12-20 h in this case, in particular 15-18 h.

As part of the rolling of the intermediate layer strip to cladding thickness, an intermediate annealing at 400-600° C. for 10-14 h, in particular at 500-550° C. for 11-13 h can additionally be carried out. This additional annealing has the advantage that the hard particles are further moulded in which therefore helps to reduce the notch effect of the hard particles on the surrounding matrix.

Temperatures of 300-330° C. are preferred for the annealing of the intermediate layer strip before the cladding with the bearing layer strip. Preferred durations are 10-12 h.

After the composite has been clad on a steel supporting layer by rolling, annealing is carried out at 250-350° C., preferably 250-300° C. for 10-24 h, in particular 12-20 h.

In particular, the aluminium alloys have no element from the group of rare-earth elements, lanthanides or actinides. It has been shown that in particular as a result of adding larger quantities of these elements, i.e. of the order of magnitude of 10 wt %, the plain bearing composite material cannot be produced without any problems by cladding because of the necessary high degrees of deformation.

The invention claimed is:

1. A plain bearing composite material comprising a metal supporting layer, an intermediate layer of an aluminium alloy and a bearing layer of an aluminium alloy, wherein the alloy components of the aluminium alloys of the intermediate layer and the bearing layer are the same apart from an additional soft phase fraction in the bearing layer, and where the quantities of the alloy components of the aluminium alloy of the intermediate layer and the aluminium alloy of the bearing layer are the same apart from the additional soft phase fraction in the bearing layer; and wherein the aluminium alloys of the intermediate and bearing layer include 1.0-3 wt. % nickel, 0.5-2.5 wt. % manganese 0.02-1.5 wt. % copper, the remainder being aluminium allowing for impurities, and wherein the aluminium alloy of the bearing layer additionally has the soft phase fraction.

2. The plain bearing composite material according to claim 1, wherein the soft phase fraction is selected from a group of materials consisting of lead, tin and/or bismuth.

3. The plain bearing composite material according to claim 1, wherein one the soft phase fraction is 5-20 wt. %.

4. The plain bearing composite material according to claim 3, wherein the soft phase fraction is 8-15 wt. %.

5. The plain bearing composite material according to claim 3, wherein the soft phase fraction is >8-12 wt. %.

6. The plain bearing composite material according to claim 2 when the soft phase fraction of tin is 9-11 wt. %.

7. The plain bearing composite material according to claim 1, wherein the intermediate layer includes hard particles with diameters of 1 to 10 μm and the bearing layer includes hard particles with diameters of 1 to 15 μm.

8. The plain bearing composite material according to claim 7, characterised in that wherein the fraction of hard particles having diameters up to 10 μm in the intermediate layer is up to 95% and the fraction of head particles having diameters up to 15 μm in the bearing layer is up to 95%.

9. The plain bearing composite material according to claim 7, wherein the hard particles include Si and intermetallic phases of Al—Ni, Al—Ni—Mn or Al—Mn.

10. The plain bearing composite material according to claim 1, wherein the thickness of the intermediate layer is 15-60 μm.

11. The plain bearing composite material according to claim 10, wherein the thickness of the intermediate layer is 35-<50 μm.

12. The plain bearing composite material according to claim 1, wherein the thickness of the intermediate layer is 5-20% of the bearing layer thickness.

13. The plain bearing composite material according to claim 12, wherein the thickness of the intermediate layer is 7-17% of the bearing layer thickness.

14. The plain bearing composite material according to claim 1, wherein a rolling-clad bond is formed between the intermediate layer and the bearing layer.

15. The plain bearing composite material according to claim 1, wherein a rolling-clad bond is formed between the intermediate layer and the metal supporting layer.

16. A method for producing a plain bearing composite material comprising a metal supporting layer, an intermediate layer of an aluminium alloy and a bearing layer of an aluminium alloy, said method comprising:
   strip casting of the aluminium alloys for the intermediate layer and bearing layer, for the production of an intermediate layer strip and a bearing layer strip, wherein the components of the aluminium alloys of the intermediate layer and the bearing layer are the same apart form an additional soft phase component in the bearing layer;
   annealing the intermediate layer strip at 400-500° C. for a duration of 10-14 hours and annealing the bearing layer strip at a temperature of 400-600° C. for a duration of 10-24 hours;
   rolling the intermediate layer strip to cladding thickness;
   annealing the intermediate layer strip at 250-350° C. for 8-14 h;
   cladding by rolling to join the intermediate layer and bearing layer strips to form a composite;
   rolling the composite to the desired cladding thickness;
   cladding by rolling the composite onto a steel supporting layer to produce a composite material; and
   annealing the composite material at 250-350° C. for 10-24 h.

17. The method according to claim 16, wherein as part of the rolling of the intermediate layer strip to cladding thickness, annealing is carried out at 400-600° C. for 10-14 h.

18. The method according to claim 17, wherein after rolling the composite to the desired cladding thickness, annealing is carried out at 250-350° C. for 10-24 h.

19. The method according to claim 17, wherein the intermediate layer strip is produced with a thickness between 25 μm and <50 μm.

* * * * *